(12) United States Patent
Lähteenmäki et al.

(10) Patent No.: US 11,463,870 B2
(45) Date of Patent: *Oct. 4, 2022

(54) WIRELESS MESH NETWORK

(71) Applicant: WIREPAS OY, Tampere (FI)

(72) Inventors: Kari Lähteenmäki, Tampere (FI);
Hannu Hirvi, Tampere (FI)

(73) Assignee: WIREPAS OY, Tampere (FI)

( * ) Notice: Subject to any disclaimer, the term of this patent is extended or adjusted under 35 U.S.C. 154(b) by 182 days.

This patent is subject to a terminal disclaimer.

(21) Appl. No.: 16/906,938

(22) Filed: Jun. 19, 2020

(65) Prior Publication Data
US 2020/0389790 A1 Dec. 10, 2020

Related U.S. Application Data

(63) Continuation of application No. 15/856,591, filed on Dec. 28, 2017, now Pat. No. 10,728,751.

(51) Int. Cl.
| | |
|---|---|
| *H04W 12/02* | (2009.01) |
| *H04W 84/18* | (2009.01) |
| *H04L 9/40* | (2022.01) |
| *G06F 21/60* | (2013.01) |
| *H04W 12/033* | (2021.01) |
| *G06F 21/62* | (2013.01) |
| *H04W 28/02* | (2009.01) |

(52) U.S. Cl.
CPC .......... *H04W 12/02* (2013.01); *G06F 21/602* (2013.01); *G06F 21/6218* (2013.01); *H04L 63/0457* (2013.01); *H04L 63/068* (2013.01); *H04W 12/033* (2021.01); *H04W 28/02* (2013.01); *H04W 84/18* (2013.01)

(58) Field of Classification Search
CPC ... H04W 12/02; H04W 12/033; H04W 28/02; H04W 84/18; H04W 12/03; H04W 12/40; H04W 40/32; G06F 21/602; G06F 21/6218; H04L 63/0457; H04L 63/068
See application file for complete search history.

(56) References Cited

U.S. PATENT DOCUMENTS

| | | | |
|---|---|---|---|
| 9,071,416 B2 | 6/2015 | Liu et al. | |
| 9,094,818 B2 * | 7/2015 | Falk | H04W 12/102 |
| 2013/0036305 A1 | 2/2013 | Yadav et al. | |

FOREIGN PATENT DOCUMENTS

DE 102008046563 3/2010

OTHER PUBLICATIONS

European Search Report for Application No. 18 21 3938, dated Mar. 18, 2019. Cited in parent application.
Office Action issued in Indian Patent Application No. 201824049683 dated May 2, 2022.

* cited by examiner

*Primary Examiner* — Beemnet W Dada
(74) *Attorney, Agent, or Firm* — Nixon & Vanderhye

(57) ABSTRACT

Disclosed is a wireless mesh network that includes a first node node and at least one second node. The first node is configured to provide a bi-directional mesh communication to the at least one second node. The first node is configured to broadcast a beacon periodically. The at least one second node is configured to sent a data frame to the first node. The data frame is encrypted by way of an Initialization Vector, which has been composed from at least a first node-specific Super Frame Counter included into the beacon, a Sender-Node-Specific-Frame Counter, and an identification of a sender.

20 Claims, 2 Drawing Sheets

US 11,463,870 B2

WIRELESS MESH NETWORK

TECHNICAL FIELD

The application relates generally to a wireless mesh network.

BACKGROUND

A wireless mesh network (WMN) 100 is formed by multiple, possibly hundreds or thousands or even more of radio nodes 102, 104 that may communicate with each other, depending on e.g. transmission range, frequency channel usage, etc. The wireless mesh network 100 may have one or more sink nodes 106 that may be part of gateways to other networks, e.g. Internet 108.

FIG. 1 presents an example of the wireless mesh network 100 that may not be in static radio environment and part of the nodes may move, appear, or disappear. Therefore, the example mesh network 100 is self-organizing, and every node 102,104 may do decisions independently, but supporting the network 100 and its data delivery functionality.

One example of the wireless mesh network 100 is a wireless sensor network (WSN) formed by sensor devices 102, 104 that produce data. Each sensor device 102, 104 may be equipped with one or more radio that is used to deliver the data towards the sink node 106. Even if a single sensor radio cannot directly reach the sink node 106, the wireless mesh network 100 formed between the sensor radio nodes 102, 104 takes care of it. A routing protocol implemented in each radio node 102, 104 chooses the way to the sink node 106. Similarly, there may be data that is delivered, over multiple radio hops, from the sink node 106 to the node(s) 102, 104 or in between nodes 102, 104.

Typically, the wireless mesh network 100 may be formed by nodes 102, 104 that have limited energy resources, like batteries, while other nodes 102, 104 may be mains powered. The battery-operated nodes 102, 104 need to restrict their operation in very short time periods to not to drain the batteries more than necessary. In the wireless mesh network 100 this means that the radio nodes 102, 104 need to be synchronized to each other. Using the synchronization and a Medium Access Control (MAC) communication protocol the nodes 102, 104 know when they should switch their transceiver on.

In addition, the transmission power of the battery-operated nodes 102, 104 should be optimized so that they only use transmitter power sufficient to reach the targeted neighbour node 102, 104. This not only saves the battery of the node 102, 104, but also to limit the radio interference in the wireless mesh network 100. The mains powered nodes 102, 104 may keep their radio on all the time, primarily in the receiving mode.

A wireless mesh network 100 may be organized in clusters 110. This means that at least one node 102, called as a cluster head 102, in the cluster 1101 has taken responsibility for maintaining the time synchronization and frequency channel co-ordination among the cluster members 104. At least the head node 102 may take a role of routing node to forward data of the cluster members 104, while the rest of the nodes 104 may not do routing. The transmission powers are adjusted to operate within the cluster 110. Each cluster head node 102 needs to be a member of at least one other cluster 110 to be able to route data forward. In addition, typically only the cluster head 102 transmits data out of the cluster 110, to the next cluster 110 on the way towards the sink node(s) 106.

SUMMARY

One object of the invention is to provide an encrypting method for a wireless mesh network, which ensure secure encryption by providing a unique Initialization Vector for AES-based ciphering. In addition, the method allows routing to change and enables to avoid sending a complete IV in each packet header.

One object of the invention is fulfilled by a wireless mesh network, device, methods, computer program, and computer-readable medium according to the independent claims.

One embodiment is a wireless mesh network (system) comprising a first node and at least one second node. The first node is configured to provide a bi-directional mesh communication to the at least one second node. The first node is configured to broadcast a beacon periodically. The at least one second node is configured to sent a data frame to the first node. The data frame is encrypted by means of an Initialization Vector (IV), which has been composed from at least a first node-specific Super Frame Counter (SFC) included into the beacon, a Sender-Node-Specific-Frame Counter (SNSC), and an identification of a sender.

One embodiment is an encrypting method for a wireless mesh network. The method comprises steps of including, by a first node, an initialized first node-specific SFC into a beacon, broadcasting, by the first node, the beacon periodically, and receiving, by at least one second node, the beacon. The method further comprises a step of composing, by the at least one second node, an IV from at least the SFC obtained from the beacon, a SNSC, and an identification of a sender, and using, by the at least one second node, the IV in order to encrypt a data frame to be sent to the first node.

One embodiment is a device (an apparatus) for a wireless mesh network. The device comprises a microcontroller unit and a radio transceiver. The device is configured to provide, by the radio transceiver, a bi-directional mesh communication to a first node device, to receive, by the radio transceiver, a broadcasted beacon from the first node device, and to sent, by the radio transceiver, a data frame to the first node device. The device encrypts the data frame by means of an IV, which has been composed from at least a first node-specific SFC included into the beacon, a SNSC, and an identification of a sender.

One embodiment is an encrypting method for a device in a wireless mesh network. The method comprises steps of providing, by the radio transceiver, a bi-directional mesh communication to a first node device, receiving, by the radio transceiver, a broadcasted beacon from the first node device, and sending, by the radio transceiver, a data frame to the first node device. The method further comprises steps of composing, by the microcontroller unit, an IV from at least a first node-specific SFC included into the beacon, a SNSC, and an identification of a sender, and encrypting, by the microcontroller unit, the data by means of the IV.

One embodiment is a computer program for encrypting by means of a device in a wireless mesh network, when run in the device (computer). The program comprises a communication code for providing, by the radio transceiver, a bi-directional mesh communication to a first node device, a receiving code for receiving, by the radio transceiver, a broadcasted beacon from the first head node device, and a sending code for sending, by the radio transceiver, a data frame to the first node device. The program further comprises a composing code for composing, by the microcontroller unit, an IV from at least a first node-specific SFC included into the beacon, a SNSC, and an identification of a sender, and an encrypting code for encrypting, by the microcontroller unit, the data by means of the IV.

One embodiment is a tangible non-volatile computer-readable medium comprising a computer program for encrypting by means of a device in a wireless mesh network, when run in the device. The program comprises a communication code for providing, by the radio transceiver, a bi-directional mesh communication to a first node device, a receiving code for receiving, by the radio transceiver, a broadcasted beacon from the first node device, and a sending code for sending, by the radio transceiver, a data frame to the first node device. The program further comprises a composing code for composing, by the microcontroller unit, an IV from at least a first node-specific SFC included into the beacon, a SNSC, and an identification of a sender, and an encrypting code for encrypting, by the microcontroller unit, the data by means of the IV.

Further embodiments are disclosed the in dependent claims.

BRIEF DESCRIPTION OF THE FIGURES

The embodiments are presented with reference to the following figures.

DETAILED DESCRIPTION OF THE FIGURES

Figure 1:
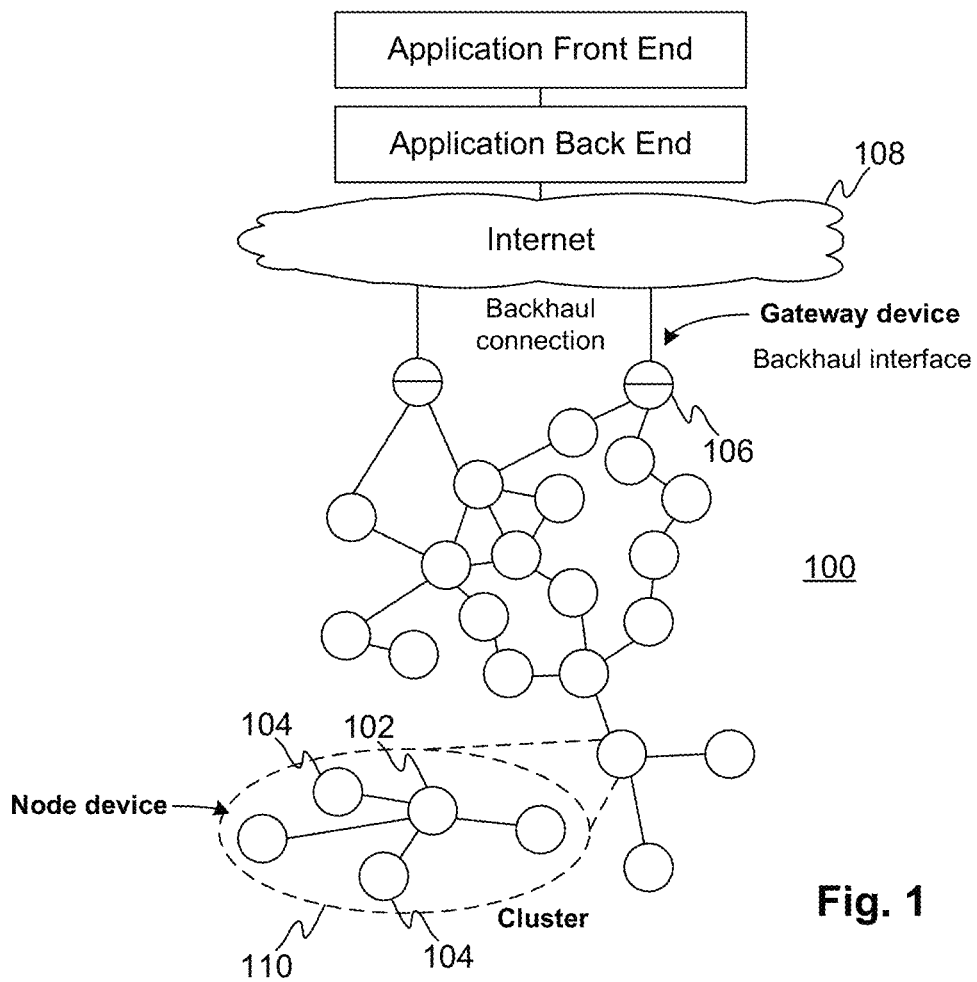
FIG. 1 presents an example of a wireless mesh network

FIG. 1 presents a wireless mesh network system 100 that comprises at least one cluster 110.

The WMN 100 is e.g. a WSN and it is designed, but not limited, for radio systems using e.g. 5 GHz, 2.4 GHz, 868 MHz, 870 MHz, and 915 MHz unlicensed frequency bands. Similarly, operation in licensed spectrum or Shared Licensed Access (LSA) spectrum can be supported.

Each cluster 110 of the WMN 100 comprises a head (first) node device 102 and at least one member (second) node (subnode) device 104, which can comprise e.g. one, two, three, four as in the figure, five or more nodes 104.

In addition, the WMN 100 can have head nodes 102 without members nodes 104. This can be especially important in edge of the WMN 100 allowing possible new nodes to find the existing WMN 100.

Alternatively, all nodes of the WMN 100 can operate as head nodes 102 and transmit a cluster beacon (message) enabling any other node to transmit for it.

Thus, an operation where only part of the nodes operate as head nodes 102 is an optimization of the WMN 100.

The head node 102 provides a bi-directional mesh data communication to the at least one member node 104 and vice versa.

The head node 102 communicates with the at least one member node 104 inside the at least one cluster and with a gateway device (sink node) 106 or other head node 102 of the WMN 100 outside the at least one cluster 110.

Alternatively, the WMN 100 can comprise only single sink node 106, which operates as a head node (cluster head) 102 and other nodes are connected with that, whereupon the nodes connected to the sink node 106 function as member nodes 104 and, thus, forming one cluster 110. However, typical sensor network is such that all nodes 104 cannot communicate directly with the sink node 106 due to extensive distance between nodes 104, 106 and limited radio range, whereupon it is needed multi-hop communication between a node 104 and the sink 106 and bene-fits of the preferred embodiments become apparent.

The head node 102 broadcasts the cluster beacon or any other broadcast message periodically, and the head and member nodes 102, 104 are configured to sent data bi-directionally in a format of data frames to each other.

Security is one of the most crucial features of the WMNs 100, to ensure trust of the communication and that data of the communication is correct. Overall end to end security contains several aspects, such as authentication, key management, providing tamper proof devices etc.

The WMN 100 is capable of routing data from single end node 102, 104 towards the sink node 106 of the WMN 100 when utilizing specific encryption method. One possible encryption method is e.g. Advanced Encryption Standard (AES) counter CTR mode for encryption and CMAC for integrity protection.

The encryption can be based on any stream cipher based on any block cipher method, which can also be e.g. Eliptic-curve cryptography (ECC), Data Encryption Standard (DES), or Triple Data Encryption Standard (DES5).

The encryption (communication) method does not consider authentication or key distribution methods, rather pre-request is that each node 102, 104 has valid key for ciphering. Any key distribution method such as pre-installed key, provisioned key material or other method would be possible with this method.

The encryption method comprises updating and maintaining an Initialization Vector (IV) which is used as nonce in ciphering protection for AES. Even though AES uses term IV, in other encryption methods can use more generic term nonce for this purpose.

The data frames in communication are encrypted by means of the IV, which has been composed from at least a head node-specific Super Frame Counter (SFC) included into the cluster beacon and a Sender-Node-Specific-Frame Counter (SNSC).

The SFC is initialized by the head node 102 when it starts to transmit the SFC in the cluster beacon. One possible method for initializing the SFC is create a random number based on information below for input data for AES-128 that is used as a hash.

Input data for hash consists of: an unique processor ID of the head node 102, a device's radio network address, and a true random number generator.

This enables that different head nodes 102 transmitting the SFC, initialize the SFC to different value, especially when starting the operation in devices (nodes 102, 104) power up or restart.

Figure 2:
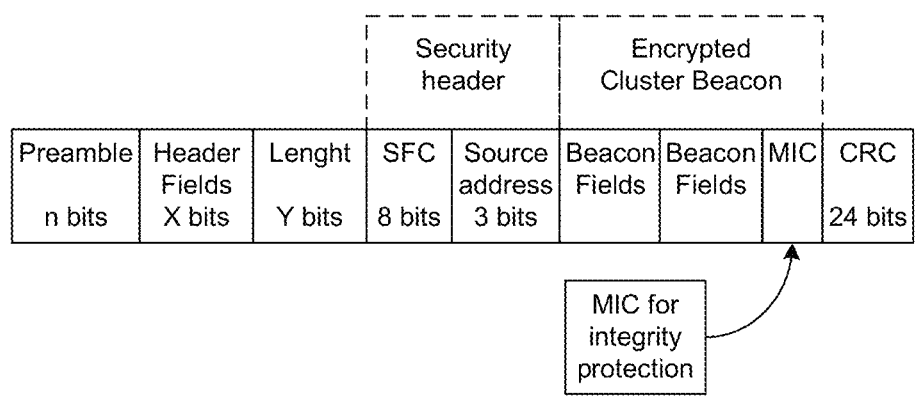
FIG. 2 presents an example of a data frame format of a cluster beacon
Figure 3:
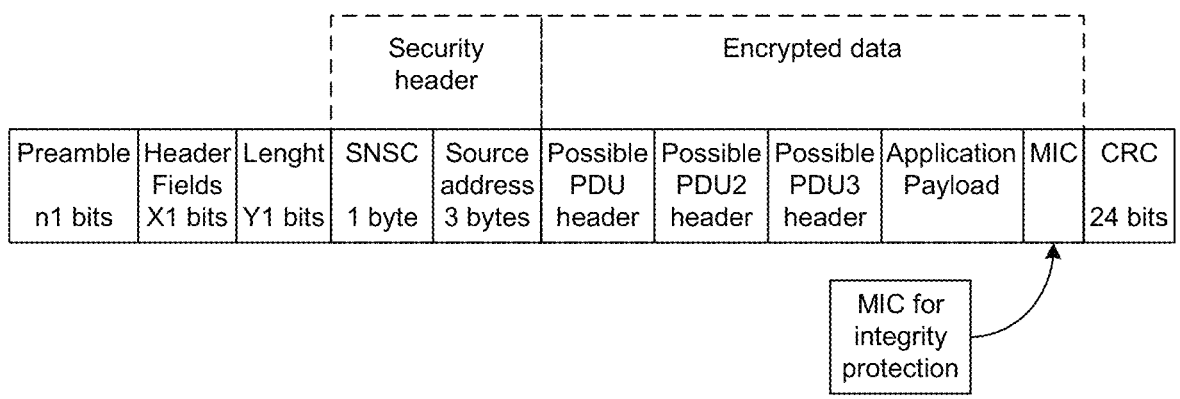
FIG. 3 presents an example of data frame format

FIG. 2 presents an example of a data frame format of a cluster beacon message and FIG. 3, for one, an example of a data frame format of a data message.

The cluster beacon can be replaced by any other broadcast message (data message) in the WMN 100 when the message contains the SFC.

The IV is divided to the SFC, a network radio address, a sender address, and the SNSC, whereupon it is easy to see that the network radio and sender addresses are used together with the SFC and SNSC to compose the IV.

The head node 102 of the cluster 110 creates the SFC by initializing randomly a SFC value, so, the SFC is a randomly initialized e.g. 8-byte counter that is individually and independently maintained by every head node 102.

The head node 102 includes the SFC to its broadcasted cluster beacon frame and transmits periodically the cluster beacon. The SFC forms half of the IV that is used during this superframe. Cluster head 102 increments the SFC before transmitting the SFC again in the cluster beacon. Periodic transmission of the SFC can be seen as superframe periods. The SFC can be incremented by one, or the incrementation can be any linear operation. Alternatively, the head node 102 initializes the SFC to new random value before a transmission of a next cluster beacon. However, in such case, each member node 104 must receive always the latest cluster beacon message. So, member nodes 104 get the SFC by receiving the cluster beacons.

Additionally, each member node 104 maintain the SFC after receiving it from the head node 102. This allows nodes 104 to send data even though they have not received previous cluster beacon message. This is possible in a cluster head operation, where the SFC is incremented by predefined value before transmission new SFC.

A network radio address (network ID), for e.g. 3 bytes are used in the IV and it is known to all nodes 102, 104 being part of the WMN 100. This information can be obtained from node's configuration containing for e.g. network provisioning credentials of the WMN 100.

Additionally, the network radio address can be hashed or simple Xor with the destination receiver address of the packet. This provides additional security measure as only intended receiver node 102, 104 can decipher the packet correctly and avoids theoretical problem that a single node 102, 104 would use same SFC value hearing different head nodes transmission. This is achieved as each node 102, 104 has unique ID in the WMN 100 and Xor that with network ID will give different sequence. Naturally, different networks 100 use different keys, so that utilization of the same IV is not an issue.

In addition, a sender address (source address, sender ID) of e.g. 3 bytes, which identifies the sender, is included to the IV by the sender node 102, 104, which is then included in all transmitted frames as plaintext as presented in FIG. 3.

The SNSC of e.g. 2 bytes is part of each data message transmitted by the node 102, 104 and is transmitted as plain text and increased with every transmitted frame. Additionally, in ciphered broadcast messages the SNSC value can be set to zero or pre-set value to avoid overhead.

The SNSC is a 2-bytes counter that directly gives the lowest byte of the IV required for message decryption. Every involved node 102, 104 may reset SNSC when the superframe starts. The resetting can set the SNSC to zero or any other initial value. To ensure uniqueness of the IV, the sender shall not use twice same SNSC with same SFC. The head node 102 can detect that some member node 104 has high number of frames since the previous SFC transmission and the node 104 is running out of SNSC space. In such case, the head node 102 can transmit cluster beacon outside normal periodicity, with a new SFC value to allow member nodes 104 to initialize the SNSC and have again an unique IV.

When a node 102, 104 creates a message to be sent, it first includes the initial SNSC to the message as plaintext. After that the message is encrypted, whereupon internal SNSC increases. At the receiving node 102, 104, the SNSC and sender node id are picked from the message and used for decryption the IV.

So, when the head node 102 includes the SFC into a frame of the cluster beacon before broadcasting it and sends the cluster beacon, it leads to a situation, where any node 104 that receives the cluster beacon can transmit the ciphered packet to the head node 102 by using the unique IV.

The node 104 can send ciphered frame to the cluster node 102 by using the IV that is composed from received SFC, network address, its own address, and SNSC. A node 102, 104 which can hear multiple network beacons can decide for every frame which cluster 110 should receive this frame as it can simply maintain multiple SFC. This allows packet by packet decision of the routing towards multiple head nodes 102 by the sender node 104. Additionally, as data packet contains the MIC for integrity protection, any node receiving the frame can determine whether it should receive that data frame, as if the node is not using a correct IV, the MIC calculation will fail.

In addition, it is possible that the head node 102 sends the SFC to the member node 104 along a data packet so that it is embedded in the data frame. This would result self-contained data frame and, then, that data frame can be received outside the cluster 110 without prior knowledge of the SFC used in the cluster 110.

Additionally, in case, that member node 104 misses the cluster beacon or cluster head 102 is not allowed (is prohibited) to send the cluster beacon, e.g. due to Listen-Before-Talk (LBT) prevention, the node 104 can predict the next used SFC value from the value used in previous cluster beacon, i.e. from prior information. Thus, the node is able to send data to the cluster head 102.

In addition, SFC information can be delivered to other head nodes 102 in the WMN 100 and out of reach the head node 102 of the cluster 110.

The IV structure provides uniqueness per message, because the IV is a network specific and a sender-node-specific. In addition, the IV can be made sender and receiver specific by additional Xor procedure between the network address and receiver address as presented above.

In addition, the IV structure is such that the IV cannot repeat inside superframe because of SNSC.

In addition, the IV structure has a 64-bit randomly initialized SFC that increases only once per superframe.

In addition, the IV structure enables that overhead of the packet is minimized. This is achieved as periodicity of the cluster beacon frame and corresponding SFC can be significantly lower than data frames transmitted by all nodes 104 communicating with the head node 102 during cluster beacon frame period. Additionally, there is no peer-to-peer signalling need when node 104 changes target cluster head 102.

Additionally, when some node 104 decides to start operating as cluster head 102, it can initiate cluster beacon transmission and any other node hearing that beacon can start using it as routing device without any peer-to-peer signalling to setup security.

Additionally, when radio condition of some member node 104 changes or the member node 104 is mobile and, thus, detects a new head node 102 from the cluster beacon, it can initiate secure communication immediately with the head node 102 after receiving the cluster beacon transmission, avoiding any non-secure signalling between the member node 104 and the head node 102 to initialize ciphering. Thus, method provides efficient way to manage the IV in the WMN 100 with mobile nodes 102, 104.

In addition, this enables a mesh network solution, where cluster beacons are transmitted and the SFC are updated with different periods in different parts of the WMN 100 independently. This supports different beacon detection rates for mobility and different IV update rates due to very high number of data from some nodes 102, 104.

Furthermore, there is no need to distribute and synchronize the IV information between all network members as in Bluetooth Mesh solution reducing the signalling overhead of the system.

It is good to notice that the number of bytes in the cluster beacon and data frames are exemplary and the number of used bytes may vary in the frames.

Figure 4:
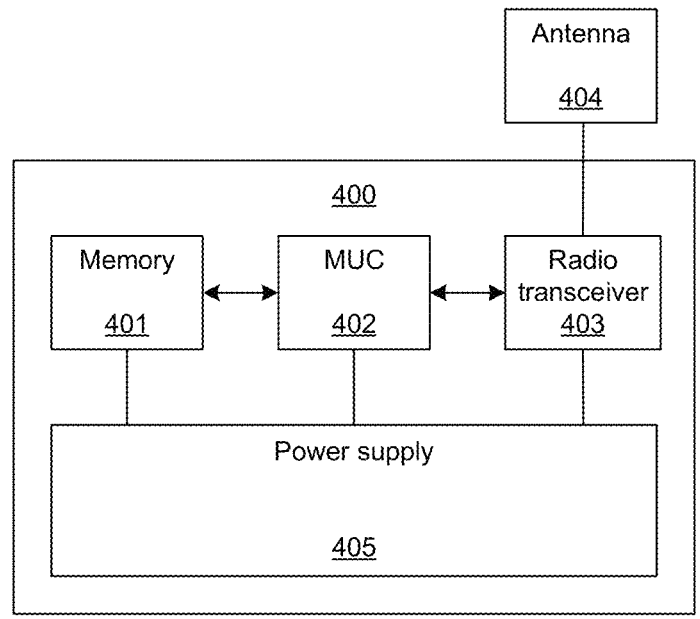
FIG. 4 presents an example of a mesh-enabled node device hardware architecture

FIG. 4 presents an example of a mesh-enabled node device hardware architecture.

A mesh-enabled node device (apparatus) 400 includes a memory 401, microcontroller unit (MCU) 402, a radio transceiver 403, antenna 404, and a power supply 405.

The node device 400 can be a head node 102 or a member node 104.

The MCU 402 is used to run computer program (code) for a possible application and WMN protocol. The node device 400 uses radio transceiver 403 in order to transmit and receive mesh data between other node devices 400 and/or the gateway device 106, and to transmit data frames via the antenna 404. The power supply 405 includes components for powering the device, e.g. a battery and a regulator.

The memory 401 comprises the computer program, which is configured to perform actions of the node 102, 104, 400 presented in this description part, when it is run in a computer, e.g. in the node 102, 104, 400 by means of the MCU 402.

Such action can be the production of a bi-directional mesh communication between the head and member (first and second) nodes 102, 104 by using the radio transceiver 403.

In addition, such action can be the inclusion of an SFC into a cluster beacon or other broadcast message, when the node 400 function as a head (first) node 102.

In addition, such action can be the broadcast of the cluster beacon or other broadcast message periodically to member nodes 104 by using the radio transceiver 403, when the node 400 function as a head node 102.

In addition, such action can be the reception of a broadcasted cluster beacon or other broadcast message from the head node device 102 by using the radio transceiver 403, when the node 400 function as a member (second) node 104.

In addition, such action can be the transmission of a data frame to the head node device 102 by using the radio transceiver 403, when the node 400 function as a member node 104.

In addition, such action can be the composition of an IV from at least a head (first) node-specific SFC included into the cluster beacon or other broadcast message, a SNSC, and an identification of a sender, when the node 400 function as a member node 104.

In addition, such action can be the encryption of the data by means of the IV, when the node 400 function as a member node 104.

The computer program can be stored in a tangible non-volatile computer readable medium, e.g an USB stick or a CD-ROM disc.

This IV structure ensures that each node 102, 104 has the IV to be used as nonce that is only used once.

In addition, the IV structure enable to avoid sending a full 16-byte IV in each data frames, whereupon data packets are shorter and those saves energy, reduce interference, and increase amount payload data per packet.

In addition, the IV structure ensures that routing of the ciphered data can change rapidly without extensive overhead to update nonce between different nodes 102, 104.

In addition, the IV structure ensures that any node 102, 104 can receive any other node's 102, 104 ciphered data with minimum delay.

In addition, the IV structure ensures that different WSNs do not use the same IV values.

In addition, the IV structure allows any single node 102,104 to transmit different data to different routing nodes 102, 104 and cipher each link independently.

In addition, the IV structure avoids security corruption in case that node 102, 104 is out coverage and cannot receive frames from other nodes 102, 104, but when getting coverage allow communication to continue without extensive signalling.

In addition, the IV structure avoids distributing updated IV to all nodes 102, 104 that are not necessary for certain data routes.

The invention claimed is:

1. A wireless mesh network comprising:
a first node; and
at least one second node,
wherein the first node is configured to provide a bi-directional mesh communication to the at least one second node, the first node being configured to broadcast a beacon periodically, the at least one second node being configured to send a data frame to the first node, the data frame being encrypted by an Initialization Vector (IV), which has been composed from at least a first node-specific Super Frame Counter (SFC) included in the beacon and an identification of a sender.

2. The network according to claim 1, wherein the first node includes the SFC into a frame of the beacon before broadcasting the beacon.

3. The network according to claim 1, wherein the first node is configured to independently maintain the SFC, which is randomly initialized.

4. The network according to claim 1, wherein the first node is configured to maintain a plurality of SFCs comprising the SFC, the first node being configured to determine a cluster belonging to the group of the at least one cluster is to receive a data frame heard by the first node.

5. The network according to claim 1, wherein the at least one second node maintains the SFC after receiving the SFC from the first node.

6. The network according to claim 1, wherein the IV further comprises a sender address and a Sender-Node-Specific-Frame Counter (SNSC), the sender address and the SNSC being used together with the SFC to compose the IV.

7. The network according to claim 6, wherein the SNSC is initialized when the SFC is incremented.

8. The network according to claim 6, wherein the SNSC is set to zero when the SFC is received with a protocol data unit (PDU) and for the composition of the IV.

9. The network according to claim 1, wherein the encryption is based on a stream cipher based on a block cipher method, which is an Advanced Encryption Standard (AES)—, Elliptic-curve cryptography (ECC)—, Data Encryption Standard (DES)—, or Triple Data Encryption Standard (DES5)-based encryption.

10. The network according to claim 1, wherein the at least one second node is configured to predict a next value for the SFC based on prior information when the at least one second node is unable to receive the beacon from the first node or the broadcast of the beacon is prohibited.

11. The network according to claim 1, wherein the at least one second node is configured to receive a SFC value of the first node embedded in the data frame.

12. The network according to claim 1, wherein SFC information is delivered to other first nodes out of reach of the first node.

13. The network according to claim 1, further comprising at least one cluster,
wherein the first node is a head node and the second node is a member node, and
wherein each of the at least one cluster comprises the head node and at least one member node.

14. The network according to claim 12, wherein the head node is configured to communicate with the at least one member node inside the at least one cluster.

15. The network according to claim 12, wherein the beacon is a cluster beacon.

16. An encrypting method for a wireless mesh network, the method comprising:
including, by a first node, an initialized first node-specific Super Frame Counter (SFC) in a beacon;
periodically broadcasting, by the first node, the beacon;
receiving, by at least one second node, the beacon;
composing, by the at least one second node, an Initialization Vector (IV) from at least the SFC obtained from the beacon and an identification of a sender; and
using, by the at least one second node, the IV in order to encrypt a data frame to be sent to the first node.

17. A node device for a wireless mesh network, the node device comprising:
a microcontroller and
a radio transceiver,
wherein the device is configured
to provide, by the radio transceiver, a bi-directional mesh communication to another node device,
to receive, by the radio transceiver, a broadcasted beacon from the other node device, and
to send, by the radio transceiver, a data frame to the other node device, and
wherein the device encrypts the data frame by an Initialization Vector (IV), composed from at least a first node-specific Super Frame Counter (SFC) included in the beacon and an identification of a sender.

18. An encrypting method for a node device in a wireless mesh network, the method comprising:
providing, by a radio transceiver of the node device, a bi-directional mesh communication to another node device;
receiving, by the radio transceiver, a broadcasted beacon from the other node device;
sending, by the radio transceiver, a data frame to the other node device;
composing, by a microcontroller of the node device, an Initialization Vector (IV) from at least a first node-specific Super Frame Counter (SFC) included in the beacon and an identification of a sender; and
encrypting, by the microcontroller, the data by the IV.

19. A non-transitory, computer-readable medium on which is stored a computer program comprising instructions, which, when the program is executed by a computer, cause the computer to carry out at least the method according to claim 18.

20. The network according to claim 2, wherein the first node is configured to independently maintain the SFC, which is randomly initialized.

* * * * *